United States Patent [19] [11] 4,197,030
Debaigt [45] Apr. 8, 1980

[54] MECHANISM FOR ASSEMBLING AND FIXING COMPONENTS SIDE BY SIDE

[75] Inventor: Jean Debaigt, Maisons-Laffitte, France

[73] Assignee: CGEE Alsthom, Levallois-Perret, France

[21] Appl. No.: 950,904

[22] Filed: Oct. 12, 1978

[30] Foreign Application Priority Data

Oct. 26, 1977 [FR] France .............................. 77 32253

[51] Int. Cl.² .............................................. F16B 35/04
[52] U.S. Cl. ...................................... 403/408; 403/24; 85/9 R
[58] Field of Search .................... 85/32 V, 32 R, 9 R, 85/1 L; 403/408, 24

[56] References Cited

U.S. PATENT DOCUMENTS

| | | | |
|---|---|---|---|
| 2,820,972 | 1/1958 | Ptak | 85/1 L X |
| 3,493,696 | 2/1970 | Rothweiler | 200/4 |
| 4,116,510 | 9/1978 | Franco | 85/32 V X |

FOREIGN PATENT DOCUMENTS 1058795 6/1959 Fed. Rep. of Germany .

Primary Examiner—Andrew V. Kundrat

Attorney, Agent, or Firm—Sughrue, Rothwell, Mion, Zinn and Macpeak

[57] ABSTRACT

The invention relates to a mechanism for assembling components side by side, said components including at least two components, namely, a front component and a rear component.

The mechanism includes firstly an assembly member (5) which has a long body (50) with a flat cross-section which has a longitudinal cut out portion (52) at its front end and a stop (51) at its rear end against the back surface of the rear component (2), the body of said assembly member passing through the back surface of said rear component and through a hole (20) which passes therethrough and having a cross-section adapted to that of said body, and secondly a screw (6) whose head (60) is disposed on the side of the front surface of a front component (4) and whose end is screwed into said cut out portion situated in a cavity (42) formed in the front part of a hole (40) which passes through the front component and in line with the hole of the rear component and having a cross-section which is adapted to the profile of the body and of the screw.

The invention applies in particular to assembly of multiple-stage switches.

5 Claims, 3 Drawing Figures

MECHANISM FOR ASSEMBLING AND FIXING COMPONENTS SIDE BY SIDE

FIELD OF THE INVENTION

The invention relates to a mechanism for assembling and fixing components side by side and in particular for assembling and fixing components of a device such as a multiple-stage switch.

BACKGROUND OF THE INVENTION

When two components are to be assembled together side by side and fixed on a support, it is very usual to employ threaded rods such as bolts. However, when the size of the equipment is small, even simple assembly rods sometimes occupy space needed for the assembled component and operational parts. This is the case in particular when the components to be fixed are contact blocks of a multiple-stage switch.

The invention aims to provide a mechanism for assembling components of an assembly and for fixing them on a support, said device being less bulky, being easy to manufacture and consequently having a low cost price.

SUMMARY OF THE INVENTION

The invention provides a mechanism for assembling components disposed side by side, said mechanism including at least two such components, namely a front component and a rear component. An assembly member which has a long body with a flat cross-section which has a longitudinal cut out portion at its front end and a stop at its rear end against the back surface of the rear component. The body of said assembly member passes through the back surface of said rear component and through a hole which passes therethrough and has a flat cross-section adapted to that of said body. A screw whose head is disposed on the side of the front surface of a front component has an end screwed into said cut out portion situated in a cavity formed in the front part of a hole which passes through the front component and in line with the hole of the rear component having a cross-section which is adapted to the profile both of the body and of the screw.

Intermediate components may be intercalated between the front component and the rear component and said intermediate components should have holes disposed in line with the hole, of the rear component, said holes having cross-sections adapted to that of the body, said body passing therethrough.

According to one embodiment, the back surface at the hole of the rear component has a hollowed out portion which contains the stop.

Preferably, a support plate is interposed between the head of the screw and the front component. The support plate is made of thermoplastic substance. The screw is a self-tapping metal screw and the diameter of the screw is slightly greater than that of the screw hole for the screw to pass through the support plate so as to form a screw brake.

The components disposed side by side may constitute a multiple-stage switch.

The characteristics and advantages of the invention will become apparent from the description of the embodiment of a switch illustrated in the accompanying drawing.

DESCRIPTION OF THE PREFERRED EMBODIMENT

Figure 1:
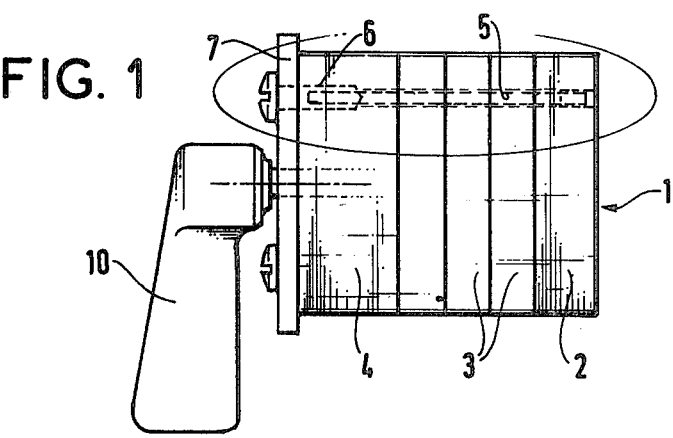
FIG. 1 is a front view of a multiple-stage switch.

In the figures, 1 designates a multiple-stage switch assembly of which 10 is the operating key. It is constituted by assembling a rear component 2, intermediate components 3 and a front component 4.

A first hole 20 passes through the rear component 2" which has a hollowed out portion 21 at its rear end.

The intermediate components 3, which constitute the contact stages of the switch, are intercalated between the rear component 2 and the front component 4. Intermediate holes 30 which have the same cross-section as the hole 20, are disposed in line therewith and pass through the intermediate components.

A hole 40 which is identical to the holes 20 and 30, is disposed in line therewith and passes through the front component 4. The hole 40 has two semi-circular hollowed out parts 41 which form a cavity 42 which has a circular cross-section and communicates with the front surface of the component 4, through which a screw 6 can be inserted.

Figure 2:
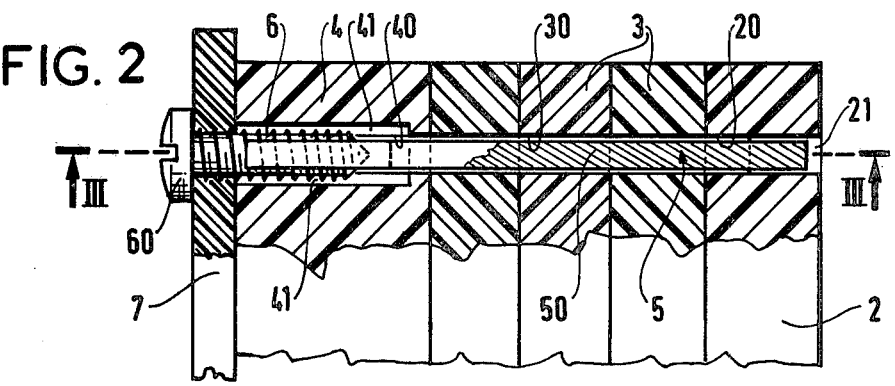
FIG. 2 is a partial cross-sectional view of the switch perpendicular to its assembly device.
Figure 3:
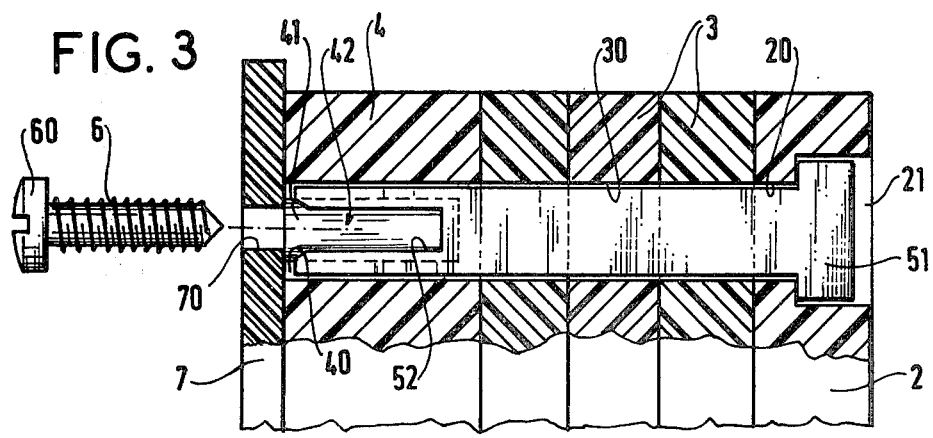
FIG. 3 is a cross-sectional view along line III—III of FIG. 2, with the screw removed.

The top part of the switch 1 is provided with an assembly member 5 and the screw 6 shown in detail and on a larger scale in FIGS. 2 and 3.

The assembly member 5 has an elongate body 50 of flat cross-section which has a front end and a rear end. A longitudinal cut out portion 52 has been provided at its front end while a widened portion of the rear end constitutes a stop 51 disposed to bear against the inside of the hollowed out portion 21.

The front surface 4 of the switch 1 is pressed against a support plate 7 made of a thermoplastic substance by means of a screw 6 which passes through a small hole 70 in the plate 7 and is screwed inside the cut out portion 52, the head 60 of the screw being applied against the front surface of the plate 7.

The various stages of the switch are assembled as follows. The front end of the assembly member is passed through the back surface of the component 2 and through the holes 20, 30, 40 until the stop 51 is applied against the bottom of the hollowed out portion 21 and the cut out portion 52 has entered the cavity 42. For this purpose, the cross-sections of the holes 20, 30 and 40 coincide with that of the body 50 leaving little play. Then the support plate 7 is applied against the front component 4, while the screw hole 70 is disposed in the axis of the cavity 42. A self-tapping metal screw 6 is screwed into the screw hole 70, whose diameter is slightly smaller than that of the screw, then into the cut out portion 52 whose diameter is likewise slightly smaller than that of the screw. For this purpose, the cross-section of the hole 40 is adapted simultaneously to the cross-section of the body 50 and to that of the screw 6, due to the hollowed out portions 41 perpendicular to the cut out portion 52 and facing the side surfaces of the body 50.

The various stages of the switch are then assembled and the screw hole 70 acts as a screw brake for the assembly screw.

Due to the flat profile of the assembly member 5, its bulk is less than that of normal screw. This leaves more space inside the various component stages.

The assembly device which has been described with reference to a multiple-stage switch can be applied to assembling components of other equipment when smaller bulk proves to be advantageous.

I claim:

1. A mechanism for assembling at least two components, namely, a front component and a rear component disposed side by side, aligned holes passing through said components, said mechanism comprising an assembly member comprising a long body of given thickness corresponding to that of said aligned holes, said long body being of rectangular flat transverse cross-section and including a longitudinally extending axial cut portion at its front end and a widened stop at its rear end and being inserted through the holes from the back surface of the rear component forwardly, the aligned holes of said front and rear components having a rectangular flat transverse cross-section of corresponding size to that of said body and forming a relatively close fit therewith, and a screw having a head disposed on the front surface of said front component and having a threaded end of larger diameter than the thickness of said assembly member long body screwed into said cut out portion of said assembly member long body, and said front component including a cavity formed in the front part of said front component hole, said cavity being in excess of the diameter of said threaded end of said screw such that said front component cross-section corresponds to the profile both of said flat cross-section long body and that of said screw to insure a tight locking assembly of said at least two components when said screw is threaded to said cut out portion of said assembly member long body.

2. An arrangement according to claim 1, wherein said at least two components further comprise intermediate components intercalated between the front component and the rear component and wherein said intermediate components have holes disposed in line with the first hole, said holes having cross-sections corresponding to that of the body and being sized thereto, said body passing therethrough.

3. An arrangement according to claim 1, wherein the back surface of the rear component at said hole has a hollowed out portion which contains the stop.

4. An arrangement according to claim 1, wherein a support plate is interposed between the head of the screw and the front component.

5. An arrangement according to claim 4, wherein the support plate is made of a thermoplastic substance, the screw is a self-tapping metal screw and the diameter of the screw is slightly greater than that of the screw hole of the support plate so as to form a screw brake.

* * * * *